United States Patent
Chen et al.

(10) Patent No.: US 12,365,750 B2
(45) Date of Patent: Jul. 22, 2025

(54) POLYMERIZATION CATALYSTS FOR PRODUCTION OF POLYETHYLENE WITH HIGH MOLECULAR WEIGHT

(71) Applicant: Dow Global Technologies LLC, Midland, MI (US)

(72) Inventors: Linfeng Chen, Beijing (CN); Kurt F. Hirsekorn, Lake Jackson, TX (US); Jeffrey A. Sims, Lake Jackson, TX (US); David M. Pearson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 752 days.

(21) Appl. No.: 17/630,798

(22) PCT Filed: Jul. 30, 2020

(86) PCT No.: PCT/US2020/044202
§ 371 (c)(1),
(2) Date: Jan. 27, 2022

(87) PCT Pub. No.: WO2021/022011
PCT Pub. Date: Feb. 4, 2021

(65) Prior Publication Data
US 2022/0389137 A1     Dec. 8, 2022

Related U.S. Application Data

(60) Provisional application No. 62/881,017, filed on Jul. 31, 2019.

(51) Int. Cl.
| C08F 4/646 | (2006.01) |
| C08F 4/655 | (2006.01) |
| C08F 4/659 | (2006.01) |
| C08F 4/6592 | (2006.01) |
| C08F 4/685 | (2006.01) |
| C08F 210/16 | (2006.01) |

(52) U.S. Cl.
CPC .................. C08F 210/16 (2013.01)

(58) Field of Classification Search
CPC .... C08F 4/646; C08F 4/6555; C08F 4/65912; C08F 4/65922; C08F 4/685
See application file for complete search history.

(56) References Cited

U.S. PATENT DOCUMENTS

| 5,739,220 A | 4/1998 | Shamshoum et al. |
| 6,291,601 B1 | 9/2001 | Debras |
| 9,045,569 B2 | 6/2015 | Jensen et al. |
| 9,403,921 B2 | 8/2016 | Bhandarkar et al. |
| 9,556,288 B2 | 1/2017 | Bhandarkar et al. |
| 9,688,795 B2 | 6/2017 | Cerk et al. |
| 2006/0173123 A1 | 8/2006 | Yang et al. |
| 2010/0036068 A1 | 2/2010 | Aso et al. |
| 2010/0036076 A1 | 2/2010 | Aso et al. |
| 2017/0114199 A1 | 4/2017 | Yang et al. |

FOREIGN PATENT DOCUMENTS

| EP | 0260130 A1 | 3/1998 |
| EP | 2913348 A1 | 2/2015 |
| EP | 2448977 B1 | 8/2015 |
| JP | S61287909 A | 12/1986 |
| JP | S63289003 A | 11/1988 |
| JP | 2010275382 A | 12/2010 |
| WO | 2017034722 A1 | 3/2017 |
| WO | 2017040127 A1 | 3/2017 |
| WO | 2018005789 A1 | 1/2018 |
| WO | 2018005821 A1 | 1/2018 |

OTHER PUBLICATIONS

Chinese Office Action dated Sep. 29, 2023, pertaining to CN Patent Application No. 202080054306.9, 21 pgs.
Brazil Office Action dated Oct. 24, 2023, pertaining to BR Patent Application No. BR112022001387-6, 3 pgs.
Singapore Written Opinion dated Dec. 4, 2023, pertaining to SG Patent Application No. 11202200369T, 7 pgs.
International Preliminary Report on Patentability dated Oct. 28, 2020, pertaining to Int'l Appl. No. PCT/US2020/044202 filed Jul. 30, 2020, 8 pgs.
Communication pursuant to EPC Rules 161 (1) & 162 EPC dated Mar. 9, 2022, pertaining to EP patent application No. 20757151.5 filed Feb. 9, 2022, 3 pages.
Japanese Office Action dated May 21, 2024, pertaining to JP Patent Application No. 2022-505565, 10 pgs.
Soga et al. "Stereospecific polymerization of propene using MgCl2-supported Ti catalysts combined with (RCp) 2TiMe2 (R=H, Me)" Makromol. Chem., Rapid Commun. 7, 719-723 (1986), 5 pgs.
Soga et al. "Stereospecific polymerization of propene using MgCl2-supported Ti catalysts combined with various alkyl titanium compounds" Makromol. Chem., Rapid Commun. 8, 273-276 (1987), 4 pgs.
International Search Report and Written Opinion dated Oct. 28, 2020, pertaining to Int'l Appl. No. PCT/US2020/044202 filed Jul. 30, 2020, 15 pgs.

*Primary Examiner* — Catherine S Branch
(74) *Attorney, Agent, or Firm* — Dinsmore & Shohl LLP

(57) ABSTRACT

The catalyst system includes a heterogeneous procatalyst, an electron donor, and a hydrogenation procatalyst. The heterogeneous procatalyst includes a titanium species, an aluminum species, and a magnesium chloride component. The hydrogenation procatalyst has the formula $Cp_2TiX_nTiCp_2$ or $Cp_2TiX_n$. In formula $Cp_2TiX_n$, each Cp is a cyclopentadienyl substituted with at least one $R^1$, wherein $R^1$ is $(C_1-C_{10})$ alkyl; and each X is independently monoanionic or neutral, wherein each X is independently $(C_1-C_{40})$hydrocarbon, $(C_1-C_{40})$heterohydrocarbon, $(C_1-C_{40})$hydrocarbyl, $(C_1-C_{40})$heterohydrocarbyl, or a halogen atom.

18 Claims, No Drawings

POLYMERIZATION CATALYSTS FOR PRODUCTION OF POLYETHYLENE WITH HIGH MOLECULAR WEIGHT

CROSS-REFERENCE TO RELATED APPLICATIONS

This application is a National Stage Entry under 35 U.S.C. § 371 of International Patent Application No. PCT/US2020/044202, filed Jul. 30, 2020, which claims priority to U.S. Provisional Patent Application No. 62/881,017, filed on Jul. 31, 2019, the entire disclosures of both of which are hereby incorporated by reference.

TECHNICAL FIELD

Embodiments of the present disclosure generally relate to catalyst compositions for polymerizing ethylene and optionally one or more α-olefins, and the polymerization processes that utilize such catalyst compositions.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based polymers are manufactured for a wide variety of articles. The polyethylene and polypropylene polymerization processes can be varied in a number of respects to produce a wide variety of resultant polyethylene resins having different physical properties that render the various resins suitable for use in different applications. The ethylene monomers and optionally one or more co-monomers are present in liquid diluents (such as solvents), such as an alkane or isoalkane, for example isobutene. Hydrogen may also be added to the reactor. The catalyst systems for producing ethylene-based polymers may typically comprise a chromium-based catalyst system, a Ziegler-Natta catalyst system, and/or a molecular (either metallocene or non-metallocene) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced.

Polymer produced by a Ziegler-Natta catalyst contains a copolymer fraction where most of comonomer in the polymer resides and a high density fraction (HDF) where there is basically no or very low level of comonomer. The molecular weight of the HDF is typically higher than that of the copolymer fraction. The molecular weight of the polymer can be increased by reducing the fraction of the copolymer and/or increasing the HDF.

Electron donors, including conventional small organic molecule electron donors or metal compounds that contains alkoxide or carboxylate ligands, in addition to Ziegler-Natta catalysts increase the HDF. However, electron donors usually decrease the efficiency of a catalyst.

Titanocene hydrogenation procatalysts have been used in (1) metallocene-catalyzed polymerization reactions, for removing $H_2$ generated by the metallocene polymerization catalysts; and (2) in one reactor of a linked reactor system, for removing $H_2$ carried over from a prior reactor. By removing the $H_2$ from a catalyst system, the $H_2$ cannot terminate the polymerization chain, thereby allowing an increase in molecular weight of the produced polymer. However, these applications of the titanocene catalysts for removing $H_2$ are limited to gas-phase and slurry-phase polymerization reactions in which reaction temperatures typically range from 60° C. to 120° C.

SUMMARY

There is an ongoing need to create catalyst systems or procatalysts that produce high molecular weight polymers at high polymerization temperatures (temperatures from 120° C. to 250° C.). Additionally, the catalyst system should have high efficiency, high reactivity, and ability to produce polymers with a high molecular weight (greater than 100,000 g/mol).

Embodiments of this disclosure include catalyst systems. The catalyst system includes a heterogeneous procatalyst, an electron donor, and a hydrogenation procatalyst. The heterogeneous procatalyst includes a titanium species, an aluminum species, and a magnesium chloride component. The hydrogenation procatalyst has the formula $Cp_2TiX_2$. In formula $Cp_2TiX_2$, each Cp is a cyclopentadienyl substituted with at least one $R^1$, wherein $R^1$ is $(C_1-C_1)$alkyl; and each X is independently a halogen atom.

Embodiments of this disclosure includes polymerize preprocess. The polymerization process for producing polyolefin polymers includes reacting $(C_2-C_{12})$α-olefins in solution in the presence of a catalyst system of this disclosure.

DETAILED DESCRIPTION

Embodiments of this disclosure include catalyst systems. The catalyst system includes a heterogeneous procatalyst and a hydrogenation procatalyst. The heterogeneous procatalyst includes a titanium species, an aluminum species, and a magnesium chloride component. The hydrogenation procatalyst has the formula $Cp_2TiX_2$. In formula $Cp_2TiX_2$, each Cp is a cyclopentadienyl substituted with at least one $R^1$, wherein $R^1$ is $(C_1-C_{10})$alkyl; and each X is independently a halogen atom.

In embodiments of the catalyst system, the heterogeneous procatalyst includes a titanium species. In some embodiments, the titanium species of the heterogeneous procatalyst may have catalytic activity. In some embodiments, the titanium species may include $TiCl_{4-c}(OR)_c$ or $TiCl_{3-d}(OR)_d$, wherein R is $(C_1-C_{20})$hydrocarbyl, subscript c is 0, 1, 2, 3, or 4, and subscript d is 0, 1, 2, or 3. In some embodiments, the titanium species may include, for example, titanium (IV) tetrachloride, titanium (III) trichloride, tris(2,2,6,6-tetramethyl-3,5-heptanedionato)titanium(III), trichlorotris(tetrahydrofuran) titanium(III), di-n-butoxytitanium(IV) dichloride, diethoxytitanium(IV) dichloride, diisopropoxytitanium(IV) dichloride, diisobutoxytitanium(IV) dichloride, triisopropoxytitanium(IV) chloride, tri-n-butoxytitanium(IV) chloride, triisobutoxytitanium(IV) chloride, titanium(IV)

tetraisopropoxide (Ti(O$^i$Pr)$_4$), titanium(IV) ethoxide, titanium(IV) n-butoxide, titanium(IV) isobutoxide, titanium(IV) 2-ethylhexoxide, dichlorobis(2,2,6,6-tetramethyl-3,5-heptanedionato)titanium(IV), tetrachlorobis(tetrahydrofuran) titanium(IV), methyltitanium (IV) trichloride, or combinations thereof. In some embodiments, the titanium species may be titanium (IV) tetrachloride or titanium(IV) tetraisopropoxide (Ti(O$^i$Pr)$_4$). For example, in some embodiments, the titanium species may include a titanium halide, a titanium alkoxide, or combinations thereof. For example, in some embodiments, the titanium species may include, but is not limited to, titanium tetrachloride (TiCl$_4$), titanium(IV) tetraisopropoxide (Ti(OiPr)4), other titanium halide or titanium alkoxide, or combinations of these.

In embodiments of the catalyst system, the heterogeneous procatalyst includes an aluminum species. In one or more embodiments, the aluminum species is chosen from trialkylaluminum, dialkylaluminum chloride, alkylaluminum dichloride, alkylaluminum alkoxide, and alkylaluminoxane.

In embodiments of the catalyst system, the heterogeneous procatalyst includes a magnesium chloride component. In one or more embodiments of the catalyst system, the magnesium chloride component of the heterogeneous procatalyst has a surface area of greater than or equal to 100 m$^2$/g as measured according to the BET method. In some embodiments, the magnesium chloride component has a surface area of greater than or equal to 150 m$^2$/g, or greater than or equal to 200 m$^2$/g. In other embodiments, the magnesium chloride component has a surface area of from 100 m$^2$/g to 800 m$^2$/g, or 200 m$^2$/g to 600 m$^2$/g, or from 300 m$^2$/g to 500 m$^2$/g.

In one or more embodiments, the magnesium chloride includes a high surface area which can be obtained from chlorination of magnesium compounds. Such magnesium compounds include organomagnesium, organomagnesium halide, magnesium alkoxide, carbonated magnesium alkoxide, magnesium carboxylate, and combinations thereof. In embodiments, magnesium chloride may be obtained from conversion of magnesium chloride adducts. Suitable magnesium chloride adducts include magnesium chloride adducts with alcohols and magnesium chloride adducts with ethers. In some embodiments, the magnesium chloride adducts are magnesium chloride adducts with ethanol. In some embodiments, the magnesium chloride adducts are magnesium chloride adducts with tetrahydrofuran.

In one or more embodiments, the magnesium chloride components include, for example, the reaction product of a chloride source with a hydrocarbon soluble hydrocarbylmagnesium compound or mixture of compounds. Exemplary organomagnesium compounds include di(C$_1$-C$_{20}$)alkylmagnesium or di(C$_1$-C$_{20}$)arylmagnesium compounds, particularly di(n-butyl)magnesium, di(sec-butyl)magnesium, diisopropylmagnesium, di-n-hexylmagnesium, isopropyl-n-butyl-magnesium, ethyl-n-hexylmagnesium, ethyl-n-butylmagnesium, di-n-octylmagnesium, and combinations thereof. Exemplary suitable magnesium diaryls include diphenylmagnesium, dibenzylmagnesium and ditolylmagnesium. The organomagnesium compounds may optionally be treated with an organoaluminum compound for improving solubility, reducing solution viscosity, or both improving solubility and reducing solution viscosity. Stabilizers, such as stabilizers derived from substituted phenol compounds, may also be present. Additional suitable organomagnesium compounds include alkyl- and aryl-magnesium alkoxides, aryloxides and chlorides, as well as mixtures of the foregoing. Highly preferred organomagnesium compounds are the halogen-free organomagnesium compounds.

Chloride sources that can be employed in the preparation of the magnesium chloride component of the heterogeneous procatalysts include metallic chlorides and nonmetallic chlorides, including organochlorides and hydrogen chloride. Examples of metallic chlorides have a formula according to MR$_{y-a}$Cl$_a$, wherein: M is a metal of Group 13, 14, or 15 of the Periodic Table of Elements; R is a monovalent organic radical; subscript y has a value equal to the valence of M, and subscript a has a value from 1 to y.

In various embodiments, the magnesium chloride component is made by chlorination of a solution of a hydrocarbon-soluble magnesium precursor to afford a MgCl$_2$ slurry in the same hydrocarbon solvent used for making the magnesium precursor solution.

In one or more embodiments, the heterogeneous procatalysts may be prepared by first preparing the magnesium chloride component (MgCl$_2$ component). The MgCl$_2$ component may be prepared by selecting an organomagnesium compound or a complex including an organomagnesium compound and reacting the organomagnesium compound with a chloride compound to make the MgCl$_2$ component. Examples of organomagnesium compounds and/or organomagnesium complexes may include, but are not limited to, magnesium C$_2$-C$_8$ alkyls and aryls, magnesium alkoxides and aryloxides, carboxylated magnesium alkoxides, and carboxylated magnesium aryloxides, or combinations of these. In some embodiments, the organomagnesium compound may include a magnesium C$_2$-C$_8$ alkyl, a magnesium C$_1$-C$_4$ alkoxides, or combinations of these. In some embodiments, the organomagnesium compound may be butyl ethyl magnesium.

To prepare the magnesium chloride component, the organomagnesium compound may be dispersed in the hydrocarbon diluent. The concentration of the organomegnesium compound in the hydrocarbon diluent may be sufficient that, when the metallic or non-metallic chloride compound and the organomagnesium compound are combined, the resultant slurry may include a concentration of magnesium of from 0.05 mol/L to 10 mol/L. The slurry of the organomagnesium compound dispersed in the hydrocarbon diluent may be contacted with the chloride compound to produce the MgCl$_2$. The chloride compound may be a metallic or non-metallic chloride. For example, in some embodiments, the chloride compound may be hydrochloride gas. In some embodiments, the slurry of organomagnesium compound and chloride compound may be contacted at a temperature of from −25° C. to 100° C., or from 0° C. to 50° C. In some embodiments, the slurry of organomagnesium compound and metallic or non-metallic chloride may be contacted for a time of from 1 hour to 12 hours, or from 4 hours to 6 hours.

The reaction of the metallic or non-metallic chloride with the organomagesium compound may produce the MgCl$_2$ component, which may be a MgCl$_2$ slurry that includes MgCl$_2$ particles dispersed in the hydrocarbon diluent. In some embodiments, the MgCl$_2$ slurry may have a concentration of MgCl$_2$ of from 0.05 mol/L to 10.0 mol/L, or from 0.2 mol/L to 1.0 mol/L, or from 0.1 mol/L to 0.3 mol/L.

In embodiments, processes for producing heterogeneous procatalysts include preparing a MgCl$_2$ slurry in a hydrocarbon solvent. The process further includes mixing the aluminum species into the MgCl$_2$ slurry. The aluminum species and MgCl$_2$ slurry mixture are heated, then the titanium species is added in the aluminum species and MgCl$_2$ slurry mixture, which is heated and stirred, and then washed is a hydrocarbon solvent to form the heterogeneous procatalyst.

In one or more embodiments, when preparing the magnesium chloride component or the heterogeneous procatalyst, the hydrocarbon solvent may be chosen from non-halogenated (C$_3$-C$_{30}$)alkyl or non-halogenated (C$_3$-C$_{30}$) cycloalkyl solvents. In some embodiments, the hydrocarbon solvent may include an isoparaffin solvent. Examples of ispoaraffin solvents may include, but are not limited to, ISOPAR™ synthetic paraffin solvents available from ExxonMobile (e.g., ISOPAR™ E paraffin solvent), and special boiling point (SBP) solvents by Shell Chemicals (e.g., SBP 100/140 high purity de-aromatized hydrocarbon solvent). Other examples of hydrocarbon solvents may include isobutene, pentane, isopentane, cyclopentane, hexane, 2-methylpentane, 3-methylpentane, cyclohexanes, methylcyclopentane, heptane, 2-methylhexane, 3-methylhexane, octane, 2,2,4-trimethylpentane, tetradecane, and combinations thereof.

In one or more embodiments of the catalyst system, the heterogeneous procatalyst is an unsupported bulk catalyst. In some embodiments, the heterogeneous procatalyst comprises heterogeneous procatalyst particles with a non-controlled morphology.

In some embodiments of the catalyst system, the heterogeneous procatalyst comprises particles with an average particle size from 0.1 micron to 10 microns. In one or more embodiments, the average particle size is less than or equal to 8 microns or is less than or equal to 6 microns. In various embodiments, the heterogeneous procatalyst includes heterogeneous procatalyst particles, in which greater than or equal to 10% of the particles have a particle size less than or equal to 1 micron. In some embodiments, greater than or equal to 20%, greater than or equal to 30%, or greater than or equal to 40% of the particles have a particle size less than or equal to 1 micron.

In embodiments of the catalyst system, the hydrogenation procatalyst has the formula Cp$_2$TiX$_2$. In formula Cp$_2$TiX$_2$, each Cp is a cyclopentadienyl substituted with at least one R$^1$, wherein R$^1$ is (C$_1$-C$_{10}$)alkyl; and each X is independently a monoanionic or neutral, wherein each X is independently (C$_1$-C$_{40}$)hydrocarbon, (C$_1$-C$_{40}$)heterohydrocarbon, (C$_1$-C$_{40}$)hydrocarbyl, (C$_1$-C$_{40}$)heterohydrocarbyl, or a halogen atom. In one or more embodiments, each Cp is substituted with at least one R$^1$ chosen from methyl, ethyl, propyl, 2-propyl, n-butyl, tert-butyl, iso-butyl, n-pentyl, n-hexyl, n-heptyl, n-octyl, 2-ethylhexyl, tert-octyl, n-nonyl, or n-decyl. In one or more embodiments, the hydrogenation procatalyst is chosen from ethylated-Cp$_2$TiCl$_2$, butylated-Cp$_2$TiCl$_2$, and ethylated-Cp$_2$TiCl$_2$.

In one or more embodiments, the hydrogenation procatalyst is chosen from bis(methylcyclopentadienyl)titanium chloride, bis(ethylcyclopentadienyl)titanium chloride, bis(butylcyclopentadienyl)titanium chloride.

In embodiments of the catalyst system, each X of the hydrogenation procatalyst bonds with M through a covalent bond, a dative bond, or an ionic bond. In some embodiments, each X is identical. The metal-ligand complex has 6 or fewer metal-ligand bonds and can be overall charge-neutral or may have a positive-charge associated with the metal center. In some embodiments, the catalyst system includes a metal-ligand complex according to formula (I), in which M is zirconium or hafnium; each X is independently chosen from (C$_1$-C$_{20}$)alkyl, (C$_1$-C$_{20}$)heteroalkyl, (C$_6$-C$_{20}$)aryl, (C$_4$-C$_{20}$) heteroaryl, (C$_4$-C$_{12}$)diene, or a halogen. In one or more embodiments, each X is independently benzyl, phenyl, or chloro.

In some embodiments, the monodentate ligand be a monoanionic ligand. Monoanionic ligands have a net formal oxidation state of Each monoanionic ligand may independently be hydride, (C$_1$-C$_{40}$)hydrocarbyl carbanion, (C$_1$-C$_{40}$) heterohydrocarbyl carbanion, halide, nitrate, carbonate, phosphate, sulfate, HC(O)O$^-$, HC(O)N(H)$^-$, (C$_1$-C$_{40}$)hydrocarbylC(O)O$^-$, (C$_1$-C$_{40}$)hydrocarbylC(O)N((C$_1$-C$_{20}$)hydrocarbyl)$^-$, (C$_1$-C$_{40}$)hydrocarbylC(O)N(H)$^-$, R$^K$R$^L$B$^-$, R$^K$R$^L$N$^-$, R$^K$O$^-$, R$^K$S$^-$, R$^K$R$^L$P$^-$, or R$^M$R$^K$R$^L$Si$^-$, where each R$^K$, R$^L$, and R$^M$ independently is hydrogen, (C$_1$-C$_{40}$)hydrocarbyl, or (C$_1$-C$_{40}$)heterohydrocarbyl, or R$^K$ and R$^L$ are taken together to form a (C$_2$-C$_{40}$)hydrocarbylene or (C$_1$-C$_{20}$)heterohydrocarbylene and R$^M$ is as defined above.

In other embodiments, at least one monodentate ligand X, independently from any other ligands X, may be a neutral ligand. In specific embodiments, the neutral ligand is a neutral Lewis base group such as R$^Q$NR$^K$R$^L$, R$^K$OR$^L$, R$^K$SR$^L$, or R$^Q$PR$^K$R$^L$, where each R$^Q$ independently is hydrogen, [(C$_1$-C$_{10}$)hydrocarbyl]$_3$Si(C$_1$-C$_{10}$)hydrocarbyl, (C$_1$-C$_{40}$)hydrocarbyl, [(C$_1$-C$_{10}$)hydrocarbyl]$_3$Si, or (C$_1$-C$_{40}$) heterohydrocarbyl and each R$^K$ and R$^L$ independently is as previously defined.

Additionally, each X can be a monodentate ligand that, independently from any other ligands X, is a halogen, unsubstituted (C$_1$-C$_{20}$)hydrocarbyl, unsubstituted (C$_1$-C$_{20}$) hydrocarbylC(O)O—, or R$^K$R$^L$N—, wherein each of R$^K$ and R$^L$ independently is an unsubstituted(C$_1$-C$_{20}$)hydrocarbyl. In some embodiments, each monodentate ligand X is a chlorine atom, (C$_1$-C$_{10}$)hydrocarbyl (e.g., (C$_1$-C$_6$)alkyl or benzyl), unsubstituted (C$_1$-C$_{10}$)hydrocarbylC(O)O—, or R$^K$R$^L$N—, wherein each of R$^K$ and R$^L$ independently is an unsubstituted (C$_1$-C$_{10}$)hydrocarbyl. In one or more embodiments, X is benzyl, chloro, —CH$_2$SiMe$_3$, or phenyl.

In further embodiments, each X is selected from methyl; ethyl; 1-propyl; 2-propyl; 1-butyl; 2,2-dimethylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2,-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In some embodiments, in formula Cp$_2$TiX$_2$, each X is a substituted benzyl or substituted heteroarylbenzyl. In other embodiments, X is selected from the group consisting of:

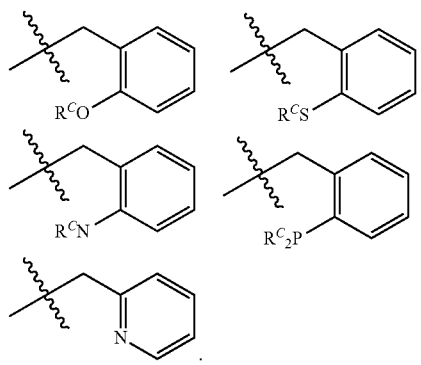

In various embodiments of the catalyst system, the catalyst system includes an electron donor. In one or more embodiments, the electron donor is a vanadium compound chosen from $VOX_3$ or $VO(OR^3)_3$, where each X is independently a halogen atom or $(C_1-C_{40})$heterohydrocarbyl anion; and $R^3$ is $(C_1-C_{20})$hydrocarbyl or $-C(O)R^{11}$, where $R^{11}$ is $(C_1-C_{30})$hydrocarbyl.

Cocatalyst Component

In some embodiments, the catalysts system may further include a co-catalyst. The heterogeneous procatalyst according to this disclosure may be combined with a cocatalyst to form a Zeigler-Natta catalyst. The Zeigler-Natta catalyst comprising the heterogeneous procatalyst may be rendered catalytically active by any technique known in the art for activating Zeigler-Matta type procatalysts of olefin polymerization reactions. Without intent to be limited, in one example, the heterogeneous procatalyst may be rendered catalytically active by contacting the procatalyst to, or combining the procatalyst with, an activating cocatalyst. Suitable activating cocatalysts for use herein include alkyl aluminums, including polymeric or oligomeric alumoxanes (also known as aluminoxanes). Combinations of one or more of the foregoing activating cocatalysts are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane. In some embodiments, the cocatalyst may be chosen from an alkyl of aluminum, a haloalkyl of aluminum, an alkylaluminum halide, and mixtures thereof. In some embodiments, the cocatalyst may be chosen from triethylaluminum, trimethylaluminum, tri-n-butylaluminum, triisobutylaluminum, tri-n-hexylaluminum, tri-n-octylaluminum, diethylaluminum chloride, MAO, MMAO, diethylaluminum ethoxide, and mixtures thereof.

Preparation of the Catalyst System

In one or more embodiments, the catalyst system is prepared by mixing the heterogeneous procatalyst, hydrogenation procatalyst, and optionally, a cocatalyst in a hydrocarbon solvent. The catalyst system may then be used in the polymerization process.

In some embodiment, the catalyst system is prepared by feeding each of the heterogeneous procatalyst, hydrogenation procatalyst and the cocatalyst into a reactor via separate feed lines and allowing at least two of the heterogeneous procatalyst, hydrogenation procatalyst and the cocatalyst to mix for 0.5 minutes to 60 minutes at ambient temperature before adding the third component to the reactor.

In other embodiments, the catalyst system is prepared by feeding each of the heterogeneous procatalyst, hydrogenation procatalyst and the cocatalyst into a reactor via separate feed lines and allowing the catalyst system to mix for 0.5 minutes to 60 minutes at ambient temperature before adding the third component to the reactor.

Embodiments of this disclosure include polymerization processes. The polymerization process for producing polyolefin polymers includes reacting one or more α-olefin monomers in solution in the presence of a catalyst system of this disclosure, in which the catalyst system includes a heterogeneous procatalyst and a hydrogenation procatalyst as previously disclosed.

In one or more embodiments of the polymerization process, the one or more α-olefin may be $(C_2-C_{12})$α-olefins. In some embodiments, there is only a single type of olefin, ethylene, in the polymerization process. In some embodiments, more than one $(C_2-C_{12})$α-olefin monomers may be incorporated into the polymerization process. In various embodiments, the $(C_2-C_{12})$α-olefin monomers include, but are not limited to, ethylene, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or from the group consisting of 1-hexene and 1-octene.

In one or more embodiments of the polymerization process, $(C_2-C_{12})$α-olefins are reacted in solution in a reactor at a reaction temperature from 150° C. to 350° C.

Embodiments of the polymerization processes include, but are not limited to, solution polymerization processes using one or more conventional reactors such as loop reactors, isothermal reactors, stirred tank reactors, batch reactors in parallel, series, or any combinations thereof, for example. In one embodiment, the polymerization process may include solution polymerization in a dual reactor system, for example a dual loop reactor system, wherein ethylene and, optionally, one or more α-olefins are polymerized in the presence of the catalyst system, as described herein, and optionally one or more cocatalysts. The catalyst system, as described herein, may be present in the first reactor or in the second reactor, optionally in combination with one or more other catalysts. In one embodiment, an ethylene-based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the polymerization process may include a solution polymerization in a single-reactor system, for example a single loop reactor system or a single stirred tank reactor system, in which ethylene and optionally one or more α-olefins are polymerized in the presence of the catalyst system, as described within this disclosure, optionally one or more cocatalysts, as described in the preceding paragraphs and optionally in combination with one or more other catalysts.

Test Methods

Specific surface area of $MgCl_2$ support is measured by Brunauer, Emmett, Teller (BET) Surface Area Method. A Tristar 3020 Surface Area Analyzer by Micromeritics is used. A amount of 30 mL of $MgCl_2$ slurry is filtered to remove solvent and then re-slurried in 30 mL of hexane. The resulting slurry is filtered again under inert atmosphere and washed with additional hexane. This process is repeated once to yield a filter cake of $MgCl_2$. Residual solvent is removed from the filter cake under vacuum. The filter cake is further dried on a Vac Prep 061 by Micromeritics using a 0.5 inch (1.27 cm) sample tube and a Transeal stopper designed for inert sample protection by loading a 0.2 g sample of the vacuum-dried $MgCl_2$ into the tube under inert atmosphere with a Transeal stopper. The sample tube is connected to the Vac Prep 061 unit with nitrogen purging. The sample tube is treated with vacuum by opening the Transeal stopper and the evacuated tube is placed in a heating block with an aluminum tube protector. The sample is dried under the vacuum on the Vac Prep 061 unit at 110° C. for 3 hours. Afterward, nitrogen is introduced into sample tube. The dried sample is allowed to cool to room temperature before disconnecting the sample tube from the Vac Prep 061 unit to give a fully dried sample. Under inert atmosphere, 0.1500 g to 0.2000 g of the fully dried sample is transferred into a clean sample tube with a tube filler rod. The sample tube is then sealed with a Transeal stopper and connected to the Tristar 3020 instrument for surface area measurement. QUICKSTART method is used for acquiring data.

Melt index (MI), or $I_2$, is measured in accordance with ASTM D 1238-10, Condition 190° C./2.16 kg, Procedure B, and is reported in grams eluted per 10 minutes (g/10 min). I10 is measured in accordance with ASTM D 1238-10, Condition 190° C./10 kg, Procedure B, and is reported in grams eluted per 10 minutes (g/10 min).

Gel Permeation Chromatography (GPC) Method

Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). The solvent is prepared by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (µm) Teflon filter to give the solvent. The solvent is degassed with an inline degasser before it enters the HTGPC instrument. Calibrate the columns with a series of monodispersed polystyrene (PS) standards. Separately, known concentrations of test polymer dissolved in solvent are prepared by heating known amounts thereof in known volumes of solvent at 160° C. with continuous shaking for 2 hours to give solutions. All quantities are measured gravimetrically. Solution concentrations, c, of test polymer are targeted from 0.5 to 2.0 milligrams polymer per milliliter solution (mg/mL), with lower concentrations, c, being used for higher molecular weight polymers. Prior to running each sample, the DRI detector is purged. Flow rate in the apparatus is increased to 1.0 mL/min, and the DRI detector is allowed to stabilize for 8 hours before injecting the first sample. The $M_w$ and $M_n$ are calculated using universal calibration relationships with the column calibrations. Calculate MW at each elution volume with equation 1 (EQU. 1):

$$\log M_X = \frac{\log(K_X/K_{PS})}{a_X + 1} + \frac{a_{PS} + 1}{a_X + 1} \log M_{PS} \qquad (EQU. 1)$$

In equation 1, subscript X stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the equation 2 (EQU. 2):

$$c = K_{DRI} I_{DRI}/(dn/dc) \qquad (EQU.2)$$

In Equation 2, $K_{DRI}$ is a constant determined by calibrating the DRI, "/" indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

Measurement of HDF (High Density Fraction, or Wt3) and Copolymer (Wt2). Improved comonomer content distribution (iCCD) analysis is performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 10 cm (length) by ¼" (ID) (0.635 cm ID) stainless is installed before IR-5 detector in the detector oven. Ortho-dichlorobenzene (ODCB, 99% anhydrous grade or technical grade) is used. Silica gel 40 (particle size 0.2~0.5 mm, catalogue number 10181-3) from EMD Chemicals are obtained (and may be used to dry ODCB solvent prior to use). The CEF instrument is equipped with an autosampler with $N_2$ purging capability. ODCB is sparged with dried nitrogen ($N_2$) for one hour before use. Sample preparation was done with autosampler at 4 mg/mL (unless otherwise specified) under shaking at 160° C. for 1 hour. The injection volume is 300 µL. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column is packed with gold coated nickel particles (Bright 7GNM8-NiS, Nippon Chemical Industrial Co.) in a 15 cm (length) by ¼" (ID) (0.635 cm) stainless tubing. The column is packed and conditioned with a slurry method according to the method presented in reference (Cong, R.; Parrott, A.; Hollis, C.; Cheatham, M. WO2017/040127A1). The final pressure with TCB slurry packing was 150 Bars.

Column temperature is calibrated by a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/mL) and eicosane (2 mg/mL) in ODCB. The iCCD temperature calibration includes four steps: (1) Calculating the delay volume defined as the temperature offset between the measured peak elution temperature of eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The modeling of the reported elution peak temperatures as a function of octene mole % using linear regression resulting in the model of Equation 3 (EQU. 3) for which $R^2$ was 0.978.

(Elution Temperature)=−6.3515(Octene Mol %)+101.000     EQU. 3

For the whole resin, integration windows are set to integrate all the chromatograms in the elution temperature (temperature calibration is specified above) range from 23.0° C. to 115° C. The weight percentage of the high density fraction of the resin (HDF, or Wt3) is defined by the following Equation 4 (EQU. 4):

$$HDF \text{ or } Wt3 = \frac{(\text{integrated area of elution window } 95-115° \text{ C.})}{(\text{integrated area of entire elution window } 23-115° \text{ C.})} \times 100\% \quad \text{EQU. 4}$$

The weight percentage of the copolymer of the resin (Wt2) is defined by the following Equation 5 (EQU. 5):

$$Wt2 = \frac{(\text{integrated area of elution window } 35-95° \text{ C.})}{(\text{integrated area of entire elution window } 23-115° \text{ C.})} \times 100\% \quad \text{EQU. 5}$$

The weight percentage of the purge fraction of the resin (PF, or Wt1) is defined by the following Equation 6 (EQU. 6):

$$Wt1 = \frac{(\text{integrated area of elution window } 23-35° \text{ C.})}{(\text{integrated area of entire elution window } 23-115° \text{ C.})} \times 100\% \quad \text{EQU. 6}$$

MW1, MW2, and MW3 are the average molecule weight of the Wt1 (purge fraction), Wt2 (copolymer), and Wt3 (HDF), respectively. Tp1, Tp2, and Tp3 refer to the peak temperatures in the iCCD plot for Wt1, Wt2, and Wt3, respectively.

Catalyst efficiency. Catalyst efficiency is calculated based on the amount of ethylene consumed during polymerization per gram of Ti in the magnesium halide-supported titanium procatalyst (g ethylene/g Ti). The grams of Ti refers to the grams of Ti contributed by the titanium species in the procatalyst and does not include any Ti contributed by the electron donor compound (the metal-ligand complex) nor the alkylated titanocene hydrogenation procatalyst.

Solution Batch Reactor Copolymerization Test Method. The batch reactor is charged with specified amounts of 1-octene and Isopar E with the total amount of 1-octene and Isopar E being 1580 g. The reactor contents are heated to 190° C., then saturated with ethylene in presence of 40 mmol of molecular hydrogen ($H_2$). The suspension of procatalyst (e.g., PCAT-1 in liquid (e.g., (C1)), cocatalyst triethylaluminum (TEA), and alkylated $Cp_2TiCl_2$ solution (e.g., E1) and external donor if needed are mixed in a separate flask, and the resulting mixture is immediately injected into the batch reactor. The molar ratio of TEA to the Ti in the procatalysts is kept at 10 for all batch reactor runs. The amount of the procatalysts is adjusted to produce approximately 25 g to 100 g of polymer. Pressure in the reactor is maintained at 3100 kilopascals (kPa; equal to 450 pounds per square inch (psi)) with ethylene flow to compensate for pressure drop due to ethylene consumption during polymerization thereof. After 10 minutes reaction time, the bottom valve is opened and the reactor contents are transferred into a glass kettle. The contents of kettle are poured onto a Mylar lined tray, allowed to cool, and placed in a fume hood overnight to evaporate most of the liquid. The remaining resin is dried in a vacuum oven to give a product poly (ethylene-co-1-octene) copolymer. The Ti in molar ratios, such as VO(O"Pr)$_3$/Ti and Cp$_2$TiCl$_2$/Ti, refers to the Ti in the procatalysts, not including the Ti from electron donor compound (the metal-ligand complex) and the alkylated titanocene hydrogenation procatalyst.

Continuous Solution Reactor Copolymerization Test Method.

The continuous solution polymerization process includes a adiabatic, continuous stirred tank reactor (CSTR). The reactor included independent control of all solvent, monomer, comonomer, hydrogen, and catalyst system component feeds. The total feed stream to the reactor, which includes the solvent, monomer, comonomer, and hydrogen, is temperature controlled by passing the total feed stream through a heat exchanger before introducing the total feed stream to the reactor. The total feed stream to the reactor is injected into the reactor at one location. The catalyst system components are injected into the reactor separate from the other feeds. An agitator in the reactor is used to continuously mix the reactants. An oil bath provides additional fine tuning of the reactor temperature control.

The ethylene monomer, 1-octene comonomer, and process solvent (SBP 100/140 by Shell Chemicals) are purified with molecular sieves before introduction into the reactor. The feed streams of monomer solvent and comonomer are pressurized via to a pressure greater than the reaction pressure. The monomer, comonomer, solvent, and hydrogen streams are combined and, then, introduced to the reactor. The individual components of the catalyst system are manually batch diluted with purified solvent/diluent and pressurized to a pressure greater than the reaction pressure. The feed lines for procatalyst (PCAT), cocatalyst, electron donor (if used), and alkylated Cp$_2$TiCl$_2$ hydrogenation procatalyst (if used) are merged into a single line and the components are mixed with each other for about 2 minutes before entering into the reactor. All reaction feed flows are measured with mass flow meters and independently controlled with metering pumps.

The final reactor effluent is passed to a zone where the catalyst system is deactivated with the addition of and reaction with water. Following catalyst deactivation, the reactor effluent is passed to a two stage de-volatization system where the ethylene-based polymer is removed from the non-polymer stream (e.g., excess monomer or comonomer, solvent, etc.). The non-polymer stream is removed from the system, and the isolated polymer melt is pelletized and collected.

EXAMPLES

The following examples are provided to illustrate embodiments described in this disclosure and are not intended to limit the scope of this disclosure or its appended claims.

Procatalyst Preparation

Compound (C1). Isopar E fluid containing >99.75% to 99.9% by weight naphtha (petroleum), light alkylate, CAS 64741-66-8, and 0.1% to <0.25% by weight isooctane CAS 540-54-1, (isoalkanes mixture) obtained from Exxon Mobil Corporation and having a boiling range of 114° C. to 139° C.

Particulate $MgCl_2$ (D1). Solid particulate $MgCl_2$ having a BET surface area of 375 $m^2/g$ to 425 $m^2/g$. Product prepared by diluting a 20 wt % solution of butylethylmagnesium in heptane into a measured quantity of (C1) to give a diluted solution; adding hydrogen chloride (HCl) slowly to the diluted solution with agitation at 30° C. until the molar ratio of Cl to Mg reaches 2.04:1.00 while maintaining the temperature at 30±3° C., to give a 0.20 M suspension of (D1) in (C1).

Preparation of Heterogeneous Procatalyst ("PCAT")

A 15% by weight ethylaluminum dichloride (EADC) solution in heptane is slowly added to the aforementioned $MgCl_2$ particulate slurry (D1) at 30° C. with agitation until the EADC/Mg ratio reaches 0.3. The temperature of the reaction mixture is maintained at 30±3° C. during the addition. The mixture is allowed to age at 30° C. for 4 hours. Subsequently, a 51 wt % titanium(IV) isopropoxide solution in heptane is slowly added to the mixture at 30° C. with agitation until the Ti/Mg ratio reaches 0.075. The temperature of the reaction mixture is maintained at 30±3° C. during the addition. The mixture is allowed to age at 30° C. for at least 8 hours. Isopar E solvent (C1) is used for rinsing for ensuring the accuracy of the catalyst formulation. The final Ti concentration for the finished procatalyst is 0.12 M.

Preparation of Modified Heterogeneous Procatalysts

Modified Procatalyst-1 ("MPCAT-1"). 20.0 mL of 0.12 M solution of PCAT-1 was transferred to a 2 ounce bottle. To the PCAT-1 solution, 1.04 mL of 0.25 M $VO(OnPr)_3$ solution in Isopar E (C1) was added with stirring. The mixture was stirred for 60 minutes before 3.90 mL of ethylated $Cp_2TiCl_2$ (E1) was slowly added with stirring. The molar ratios for the finished catalyst, Ti (PCAT-1):$VO(O''Pr)_3$:$Cp_2TiCl_2$, was 1:1:3. The modified procatalyst was aged for at least 24 hours before use in polymerization processes.

Modified Procatalyst-2 ("MPCAT-2"). 20.0 mL of 0.12 M solution of PCAT-1 was transferred to a 2 ounce bottle. To the PCAT-1 solution, 1.56 mL of 0.25 M $VO(O''Pr)_3$ solution in Isopar E (C1) was slowly added with stirring. The mixture was stirred for 60 minutes before 1.30 mL of ethylated $Cp_2TiCl_2$ (E1) was slowly added with stirring. The molar ratios for the finished catalyst, Ti (PCAT-1):$VO(O''Pr)_3$:$Cp_2TiCl_2$, was 1:1.5:1. The modified procatalyst was aged for at least 24 hours before use in polymerization processes.

Modified Procatalyst-3 ("MPCAT-3"). 800 mL of 0.12 M solution of PCAT-1 was transferred to a 1 L bottle. To the PCAT-1 solution, 20.8 mL of 0.5 M $VO(O''Pr)_3$ solution in Isopar E (C1) was added with stirring. The molar ratios for the finished catalyst is Ti (PCAT-1):$VO(O''Pr)_3$ was 1:1. The modified procatalyst was aged for at least 24 hours before use in polymerization processes.

Modified Procatalyst-4 ("MPCAT-4"). 800 mL of 0.12 M solution of PCAT-1 was transferred to a 1 L bottle. To the PCAT-1 solution, 15.6 mL of 1.0 M $Ti(O^iPr)_4$ solution in Isopar E (C1) was slowly added with stirring. The molar ratios for the finished catalyst is Ti (PCAT-1):$Ti(O^1Pr)_4$=1:1.5. The modified procatalyst was aged for at least 24 hours before use in polymerizatio processes.

Preparation of the Hydrogenation Procatalyst

Example 1: Bis(ethylcyclopentadienyl)titanium chloride (E1). Place 1.000 g of $Cp_2TiCl_2$ and a stir bar in a 2 ounce bottle. Slowly add 20.1 mL of 1.0 M triethylaluminum (TEA) solution in heptane over about 10 minutes with stirring. The solid $Cp_2TiCl_2$ becomes soluble and forms a blue solution.

Ethylene was polymerized in the presence of different amounts of $H_2$ for establishing a relationship between (1) polymer molecular weight (Mw) and $H_2$ amount; (2) Mw/Mn and Mw; and (3) Mz/Mw and Mw), and the characteristics of the resulting polymeric and catalyst systems were recorded in Tables 1-4.

The results recorded in Table 1 were obtained with reaction conditions of: ethylene 450 psi; 250 g of 1-octene; treithylalumnium cocatalyst; 190° C.; 1350 g ISOPAR-E; 10 min run time.

TABLE 1

Effects of External Electron Donor $VO(O''Pr)_3$ or Hydrogenation Procatalyst Ethylated $Cp_2TiCl_2$ on PCAT-1

| Run # | Procatalyst | Procatalyst Loading (μmol Ti) | $VO(O''Pr)_3$/ Ti (mol/mol) | $Cp_2TiCl_2$/ Ti (mol/mol) | TEA/ Ti (mol/mol) | Efficiency (kg/mg Ti) | Mw (GPC) (g/mol) | Mw/ Mw(0) (GPC)** |
|---|---|---|---|---|---|---|---|---|
| CE1 | PCAT-1 | 2.5 | 0 | 0 | 15 | 0.38 | 104,182 | 1.00 |
| CE2 | PCAT-1 | 3.5 | 0 | 1 | 15 | 0.18 | 115,931 | 1.11 |
| CE3 | PCAT-1 | 3.5 | 0 | 2 | 15 | 0.15 | 121,413 | 1.17 |
| CE4 | PCAT-1 | 3.5 | 0 | 3 | 15 | 0.13 | 140,075 | 1.34 |
| CE5 | PCAT-1 | 3.5 | 0.5 | 0 | 15 | 0.36 | 118,920 | 1.14 |
| CE6 | PCAT-1 | 4.0 | 1 | 0 | 15 | 0.36 | 119,759 | 1.15 |
| CE7 | PCAT-1 | 4.5 | 1.5 | 0 | 15 | 0.24 | 120,983 | 1.16 |

*Catalyst efficiency is calculated from the amount of ethylene consumed during polymerization per gram of Ti in the magnesium halide-supported titanium procatalyst (kilograms of produced polymer per milligram of Ti).
**Mw(0) refers to the Mw of CE1 which was obtained without external electron donor and hydrogenation procatalyst. The ratio of Mw/Mw(0) is a measurement of change in Mw from adding external electron donor and/or hydrogenation procatalyst.

Results in Table 1 indicate that as the amount of external electron donor or hydrogenation procatalyst increases, the molecular weight of the polymers obtained also increases. For example, the catalyst system in Run CE4 included a hydrogenation procatalyst with a 3:1 molar ratio of $Cp_2TiCl_2$/Ti and produced a polymer with a molecular weight 34% greater than that of the polymer produced by the catalyst system in CE1, which lacked a hydrogenation procatalyst. As a second example, the catalyst system in Run CE7 included an electron donor, $VO(O''Pr)_3$ and produced a polymer with a molecular weight 16% greater than that of the polymer produced in Run CE1.

In Tables 2, 4, and 8, the results of the improved comonomer content distribution (iCCD) are recorded. As previously described, Wt1 is the weight percentage of the purge fraction of the polymer and is defined as the integrated area of the elution window from 23° C. to 35° C. divided by the area of the entire elution window from 23° C. to 115° C., as shown in equation 6. Wt2 is the weight percentage of the copolymer fraction of the polymer and is defined as the integrated area of the elution window from 35° C. to 95° C. divided by the area of the entire elution window from 23° C. to 115° C., as shown in equation 5. Wt3 is the weight percentage of the high density fraction of the polymer and is defined as the integrated area of the elution window from 23° C. to 25° C. divided by the area of the entire elution window from 95° C. to 115° C., as shown in equation 4.

In Table 3, Mw(Calcd.) is calculated by multiplying three values: (1) Mw(0); (2) the Mw/Mw(0) ratio reported in Table 1 for the Run having an identical ratio of the electron donor to Ti; and (3) the Mw/Mw(0) ratio reported in Table 1 for the Run having an identical ratio of the hydrogenation procatalyst to Ti. The value Mw(0) for all calculations is 104,182 g/mol, that is, the molecular weight of the polymer produced by the catalyst system of Run CE1 without an electron donor and without a hydrogenation precatalyst. As

TABLE 2

Effects of Electron Donor $VO(O^nPr)_3$ or Hydrogenation Procatalyst Ethylated $Cp_2TiCl_2$ on PCAT-1 - Improved Comonomer Content Distribution (iCCD) Results

| Run # | $VO(O^nPr)_3$/Ti (mol/mol) | $Cp_2TiCl_2$/Ti (mol/mol) | Wt1 (%) (iCCD) | Wt2 (%) (iCCD) | Wt3 (%) (iCCD) | Tp1 (° C.) (iCCD) | Tp2 (° C.) (iCCD) | Tp3 (° C.) (iCCD) | MW2 (iCCD) | MW3 (iCCD) | Wt3/Wt2 (iCCD) |
|---|---|---|---|---|---|---|---|---|---|---|---|
| CE1 | 0 | 0 | 1 | 78 | 20 | 30.0 | 81.7 | 99.3 | 83,541 | 142,795 | 0.26 |
| CE2 | 0 | 1 | 4 | 76 | 20 | 30.0 | 80.7 | 99.5 | 84,718 | 150,624 | 0.26 |
| CE4 | 0 | 3 | 2 | 76 | 22 | 30.1 | 81.1 | 99.7 | 89,102 | 162,070 | 0.29 |
| CE5 | 0.5 | 0 | 2 | 76 | 22 | 30.0 | 82.3 | 99.6 | 93,265 | 150,822 | 0.29 |
| CE6 | 1 | 0 | 2 | 73 | 25 | 30.0 | 84.2 | 99.6 | 98,140 | 151,572 | 0.34 |
| CE7 | 1.5 | 0 | 1 | 66 | 33 | 30.1 | 88.4 | 99.8 | 101,295 | 153,183 | 0.50 |

Across Runs CE5, CE6, and CE7, the ratio of electron donor to Ti in the heterogeneous procatalyst molar ratio was increased. As the molar ratio was increased, the copolymer content (Wt2) decreased and the HDF (Wt3) increased, thereby resulting in greater Wt3/Wt2 ratios for CE5, CE6, and CE7. The HDF (Wt3) has a molecular weight greater than that of the copolymer content (Wt2); therefore an increase in the Wt3/Wt2 ratio significantly contributes to the increase of the overall molecular weight of the produced polymer.

In Runs CE2 and CE4, the catalyst system contained the alkylated $Cp_2TiCl_2$ hydrogenation procatalyst and lacked the electron donor. The HDF (Wt3) and copolymer content (Wt2) of the polymers produced by the catalyst systems CE2 and CE4 were nearly identical to the HDF (Wt3) and copolymer content (Wt2) of the polymer produced by the catalyst system of CE1 without the hydrogenation procatalyst. Therefore, it is believed that the hydrogenation procatalyst did not affect the HDF and the comonomer content of a polymer.

The results recorded in Tables 3 and 4 were obtained with reaction conditions of: ethylene 450 psi; 250 g of 1-octene; triethylaluminum co-catalyst; 190° C.; 1350 g ISOPAR-E; 10 min run time.

an example calculation, the catalyst system of IE4 had a 1:1 molar ratio of $VO(O^nPr)_3$/Ti and a 2:1 molar ratio of $Cp_2TiCl_2$/Ti. Therefore, the corresponding Runs in Table 1, are CE6 with respect to $VO(O^nPr)_3$/Ti ratio and CE3 with respect to $Cp_2TiCl_2$/Ti ratio. Thus, Mw(Calcd.) for IE4 equals Mw(0) times the Mw/Mw(0) of Run CE6 times the Mw/Mw(0) of Run CE3, that is, 104,182 g/mol×1.15× 1.17=139,568 g/mol.

The hydrogenation procatalyst and the external electron donors did not interfere with each other on their abilities to increase the molecular weight of the produced polymer, even under high temperature solution polymerization conditions. The molecular weight of the polymer produced by the catalyst system having the heterogeneous procatalyst, the hydrogenation procatalyst, and the electron donor is substantially greater than when compared to the polymer produced with the comparative catalyst systems that lacked an electron donor or a hydrogenation procatalyst.

TABLE 3

Simultaneous Effects of External Electron Donor $VO(O^nPr)_3$ and Hydrogenation Procatalyst Ethylated $Cp_2TiCl_2$ on PCAT-1 - Catalyst Performance and GPC Results

| Run # | Procat. | Procat. Loading (μmol Ti) | $VO(O^nPr)_3$/Ti (mol/mol) | $Cp_2TiCl_2$/Ti (mol/mol) | TEA/Ti (mol/mol) | Efficiency (kg/mg Ti) | Mw (GPC) (g/mol) | Mw/Mw(0) (GPC) | Mw (Calcd.) (g/mol) | Mw/Mw (Calcd.) |
|---|---|---|---|---|---|---|---|---|---|---|
| IE1 | PCAT-1 | 3.5 | 0.5 | 1 | 15 | 0.29 | 122,436 | 1.18 | 132.332 | 0.93 |
| IE2 | PCAT-1 | 3.5 | 0.5 | 3 | 15 | 0.19 | 144,527 | 1.39 | 159.891 | 0.90 |
| IE3 | PCAT-1 | 4.0 | 1 | 1 | 15 | 0.20 | 121,416 | 1.17 | 133.265 | 0.91 |
| IE4 | PCAT-1 | 4.0 | 1 | 2 | 15 | 0.22 | 140,350 | 1.35 | 139.568 | 1.01 |
| IE5 | PCAT-1 | 4.0 | 1 | 3 | 15 | 0.17 | 187,384 | 1.80 | 161.019 | 1.16 |
| IE6 | PCAT-1 | 4.5 | 1.5 | 1 | 15 | 0.16 | 188,357 | 1.81 | 134.627 | 1.40 |
| IE7 | PCAT-1 | 4.5 | 1.5 | 2 | 15 | 0.15 | 237,383 | 2.28 | 140.994 | 1.68 |
| IE8 | PCAT-1 | 4.5 | 1.5 | 3 | 15 | 0.12 | 247,446 | 2.38 | 162.665 | 1.52 |

TABLE 4

Simultaneous Effects of Electron Donor VO(O"Pr)$_3$ and Hydrogenation Procatalyst Ethylated Cp$_2$TiCl$_2$ on PCAT-1 - iCCD Results

| Run # | VO(O"Pr)$_3$/Ti (mol/mol) | Cp$_2$TiCl$_2$/Ti (mol/mol) | Wt1 (%) (iCCD) | Wt2 (%) (iCCD) | Wt3 (%) (iCCD) | Tp1 (° C.) (iCCD) | Tp2 (° C.) (iCCD) | Tp3 (° C.) (iCCD) | MW2 (iCCD) | MW3 (iCCD) | Wt3/Wt2 (iCCD) |
|---|---|---|---|---|---|---|---|---|---|---|---|
| IE1 | 0.5 | 1 | 2 | 76 | 22 | 30.0 | 82.1 | 99.6 | 102,789 | 167,150 | 0.29 |
| IE2 | 0.5 | 3 | 1 | 73 | 26 | 30.0 | 82.6 | 99.8 | 114,118 | 186,379 | 0.35 |
| IE3 | 1 | 1 | 2 | 72 | 25 | 30.0 | 82.6 | 99.7 | 102,037 | 160,827 | 0.35 |
| IE4 | 1 | 2 |   | 70 | 29 | 30.0 | 82.6 | 99.9 | 118,108 | 180,999 | 0.41 |
| IE5 | 1 | 3 | 1 | 68 | 32 | 30.0 | 81.9 | 100.0 | 132,267 | 206,335 | 0.47 |
| IE6 | 1.5 | 1 | 1 | 64 | 35 | 30.1 | 84.5 | 100.2 | 137,812 | 217,589 | 0.54 |
| IE7 | 1.5 | 2 | 4 | 60 | 36 | 30.1 | 84.4 | 100.5 | 157,811 | 254,646 | 0.60 |
| IE8 | 1.5 | 3 | 4 | 59 | 38 | 30.0 | 83.7 | 100.6 | 159,249 | 263,146 | 0.64 |

The results recorded in Table 5 were obtained with reaction conditions of: ethylene 450 psi; 25 g of 1-octene; triethylaluminum co-catalyst; 190° C.; 1350 g ISOPAR-E; 10 min run time.

The addition of the hydrogenation procatalyst and the electron donor to the heterogeneous procatalyst produced polymers that had a molecular weight greater than the molecular weight of the polymer produced by the catalyst

TABLE 5

Effects of External Electron Donor VO(O"Pr)$_3$ or Hydrogenation Procatalyst Ethylated Cp$_2$TiCl$_2$ on PCAT-1 - Catalyst Performance and GPC Results

| Run # | Procat. | Procat. Loading (μmol Ti) | VO(O"Pr)$_3$/Ti (mol/mol) | Cp$_2$TiCl$_2$/Ti (mol/mol) | TEA/Ti (mol/mol) | Efficiency (g/g Ti) ×10$^6$ | Mw (GPC) | Mw/Mw(0) (GPC) |
|---|---|---|---|---|---|---|---|---|
| CE8 | PCAT-1 | 2.5 | 0 | 0 | 15 | 0.53 | 128,966 | 1.00 |
| CE9 | PCAT-1 | 3.5 | 0 | 1 | 15 | 0.28 | 135,180 | 1.05 |
| CE10 | PCAT-1 | 3.5 | 0 | 2 | 15 | 0.23 | 161,053 | 1.25 |
| CE11 | PCAT-1 | 3.5 | 0 | 3 | 15 | 0.17 | 192,143 | 1.49 |
| CE12 | PCAT-1 | 3.5 | 0.5 | 0 | 15 | 0.41 | 139,743 | 1.08 |
| CE13 | PCAT-1 | 4.0 | 1 | 0 | 15 | 0.53 | 120,590 | 0.94 |
| CE14 | PCAT-1 | 4.5 | 1.5 | 0 | 15 | 0.39 | 132,871 | 1.03 |

As previously stated, the combination of the heterogeneous procatalyst and the electron donor, the vanadium compound, increases the HDF (Wt3) of the produced polymer. The amount of the comonomer in the produced polymer can also affect the molecular weight. The reaction conditions to obtain the results in Table 5 included a low amount of low 1-octene. The results indicated that the decrease in octene in the polymerization conditions did not affect the trend as observed in the results in Table 1.

The results recorded in Tables 6 were obtained with reaction conditions of: ethylene 450 psi; 250 g of 1-octene; triethylaluminum co-catalyst; 190° C.; 1350 g ISOPAR-E; 10 min run time.

system having: a heterogeneous procatalyst and hydrogenation procatalyst; or heterogeneous procatalyst and the electron donor; or the heterogeneous procatalyst.

The results recorded in Tables 7 were obtained with reaction conditions of: ethylene 450 psi; 250 g of 1-octene; triethylaluminum co-catalyst; 190° C.; 1350 g ISOPAR-E; 10 min run time.

TABLE 6

Simultaneous Effects of External Electron Donor VO(O"Pr)$_3$ and Hydrogenation Procatalyst Ethylated Cp$_2$TiCl$_2$ on PCAT-1 - Catalyst Performance and GPC Results

| Ex # | Procatalyst | Procatalyst Loading (μmol Ti) | VO(O"Pr)$_3$/Ti (mol/mol) | Cp$_2$TiCl$_2$/Ti (mol/mol) | TEA/Ti (mol/mol) | Efficiency (g/g Ti) ×10$^6$ | Mw (GPC) | Mw/Mw(0) (GPC) | Mw (Calcd.) | Mw/Mw (Calcd.) |
|---|---|---|---|---|---|---|---|---|---|---|
| IE9 | PCAT-1 | 3.5 | 0.5 | 1 | 15 | 0.37 | 180,303 | 1.40 | 146,475 | 1.23 |
| IE10 | PCAT-1 | 3.5 | 0.5 | 2 | 15 | 0.29 | 213,646 | 1.66 | 174,511 | 1.22 |
| IE11 | PCAT-1 | 3.5 | 0.5 | 3 | 15 | 0.22 | 239,438 | 1.86 | 208,199 | 1.15 |
| IE12 | PCAT-1 | 4.0 | 1 | 1 | 15 | 0.29 | 248,738 | 1.93 | 126,400 | 1.97 |
| IE13 | PCAT-1 | 4.0 | 1 | 2 | 15 | 0.16 | 230,394 | 1.79 | 150,593 | 1.53 |
| IE14 | PCAT-1 | 4.0 | 1 | 3 | 15 | 0.22 | 291,528 | 2.26 | 179,664 | 1.62 |
| IE15 | PCAT-1 | 4.5 | 1.5 | 1 | 15 | 0.20 | 358,484 | 2.78 | 139,272 | 2.57 |
| IE16 | PCAT-1 | 4.5 | 1.5 | 2 | 15 | 0.21 | 318,055 | 2.47 | 165,929 | 1.92 |
| IE17 | PCAT-1 | 4.5 | 1.5 | 3 | 15 | 0.17 | 307,305 | 2.43 | 197,961 | 1.55 |

TABLE 7

Procatalyst Pretreated with Electron Donor and/or Hydrogenation Procatalyst - Catalyst Performance and GPC Results

| Ex # | Procat. | Procat. Loading (μmol Ti) | VO(O"Pr)$_3$/ Ti (mol/mol) | Cp$_2$TiCl$_2$/ Ti (mol/mol) | TEA/ Ti (mol/mol) | Efficiency (kg/mg Ti) | Mw (GPC) (g/mol) | Mw/ Mw (0) (GPC) | Mw (Calcd.) (g/mol) | Mw/ Mw (Calcd.) |
|---|---|---|---|---|---|---|---|---|---|---|
| CE15 | PCAT-1 | 2.5 | 0 | 0 | 15 | 0.39 | 104,200 | 1.00 | — | — |
| IE18 | MPCAT-1 | 6.0 | 0 | 0 | 15 | 0.11 | 212,178 | 2.04 | 161,047 | 1.32 |
| IE19 | MPCAT-2 | 6.0 | 0 | 0 | 15 | 0.18 | 262,692 | 2.52 | 134,651 | 1.95 |
| IE20 | MPCAT-3 | 6.0 | 0 | 3 | 15 | 0.14 | 253,765 | 2.44 | 161,047 | 1.58 |

MPCAT-1 is PCAT-1 pretreated with an electron donor, VO(O"Pr)$_3$, having a 1:1 molar ratio of VO(O"Pr)$_3$:Ti, and a hydrogenation procatalyst, ethylated Cp$_2$TiCl$_2$, (E2) having a 3:1 molar ratio of Cp$_2$TiCl$_2$:Ti. When ethylene and 250 g of 1-octene are polymerized in the presence of a catalyst system containing MPCAT-1, a large increase in the produced polymer molecular weight was observed in comparison to the polymer produced in by the untreated PCAT-1. The molecular weight of the polymer produced by the pretreated catalyst (MPCAT-1) was greater than the molecular weights of polymers produced by catalysts systems having VO(O"Pr)$_3$ ethylated Cp$_2$TiCl$_2$ (E1), and the heterogeneous procatalyst, PCAT-1. For example, the polymer produced in Run IE5 had a molecular weight of 187,384 g/mol.

When PCAT-1 was pretreated with VO(O"Pr)$_3$ to yield a 1:1 molar ratio of VO(O"Pr)$_3$/Ti, and the resulting procatalyst, MPCAT-3, was combined with Cp$_2$TiCl$_2$ (E1) in a 3:1 molar ratio of Cp$_2$TiCl$_2$/Ti, there is a further increase in polymer molecular weight over the produced polymer of Run IE18, even though the ratio of electron donor and hydrogenation procatalyst are exactly the same (IE20 vs. IE18).

The results recorded in Tables 7 were obtained with reaction conditions of: ethylene 450 psi; 250 g of 1-octene; triethylaluminum co-catalyst; 190° C.; 1350 g ISOPAR-E; 10 min run time.

TABLE 8

Procatalyst Pretreated with Electron Donor and/or Hydrogenation Procatalyst: iCCD Results

| Run # | VO(O"Pr)$_3$/ Ti (mol/mol) | Cp$_2$TiCl$_2$/ Ti (mol/mol) | Wt1 (%) (iCCD) | Wt2 (%) (iCCD) | Wt3 (%) (iCCD) | Tp1 (° C.) (iCCD) | Tp2 (° C.) (iCCD) | Tp3 (° C.) (iCCD) | MW2 (iCCD) | MW3 (iCCD) | Wt3/ Wt2 (iCCD) |
|---|---|---|---|---|---|---|---|---|---|---|---|
| CE15 | 0 | 0 | 0.06 | 0.77 | 0.18 | 29.8 | 80.5 | 99.5 | 87,497 | 152,681 | 0.23 |
| IE18 | 0 | 0 | 0.04 | 0.66 | 0.30 | 29.8 | 81.0 | 100.6 | 131,114 | 240,260 | 0.46 |
| IE19 | 0 | 0 | 0.03 | 0.60 | 0.37 | 29.8 | 82.7 | 100.7 | 143,302 | 254,287 | 0.61 |
| IE20 | 0 | 3 | 0.04 | 0.58 | 0.38 | 29.9 | 82.0 | 100.7 | 141,279 | 249,172 | 0.65 |

The results recorded in Tables 9 were obtained with reaction conditions of: ethylene psi; 25 g of 1-octene; triethylaluminum co-catalyst; 190° C.; 1475 g ISOPAR-E; 10 min run time.

TABLE 9

Procatalyst Pretreated with Electron Donor and/or Hydrogenation Procatalyst - Catalyst Performance and GPC Results

| Run # | Procat. | Procat. Loading (μmol Ti) | VO(O"Pr)$_3$/ Ti (mol/mol) | Cp$_2$TiCl$_2$/ Ti (mol/mol) | TEA/ Ti (mol/mol) | Eff. (kg/mg Ti) | Mw (GPC) | Mw/ Mw (0) (GPC) | Mw (Calcd.) | Mw/ Mw (Calcd.) |
|---|---|---|---|---|---|---|---|---|---|---|
| CE16 | PCAT-1 | 2.5 | 0 | 0 | 15 | 0.48 | 125,792 | 1.00 | — | — |
| IE21 | MPCAT-1 | 6.0 | 0 | 0 | 15 | 0.12 | 240,853 | 1.91 | 175,242 | 1.37 |

TABLE 9-continued

Procatalyst Pretreated with Electron Donor and/or Hydrogenation
Procatalyst - Catalyst Performance and GPC Results

| Run # | Procat. | Procat. Loading (μmol Ti) | VO(O"Pr)$_3$/ Ti (mol/mol) | Cp$_2$TiCl$_2$/ Ti (mol/mol) | TEA/ Ti (mol/mol) | Eff. (kg/mg Ti) | Mw (GPC) | Mw/ Mw (0) (GPC) | Mw (Calcd.) | Mw/ Mw (Calcd.) |
|---|---|---|---|---|---|---|---|---|---|---|
| IE22 | MPCAT-2 | 6.0 | 0 | 0 | 15 | 0.15 | 333,569 | 2.65 | 135,844 | 2.46 |
| IE23 | MPCAT-3 | 6.0 | 0 | 3 | 15 | 0.15 | 310,740 | 2.47 | 175,242 | 1.77 |
| IE24 | MPCAT-4 | 6.0 | 0 | 1 | 15 | 0.18 | 311,554 | 2.48 | — | — |

As previously stated the amount of comonomer in a polymer can affect the molecular weight of the polymer. Ethylene polymerization reactions were carried out in the presence of catalyst systems that were pretreated in polymerization conditions having a low amount of 1-octene. The catalysts systems included a heterogeneous procatalysts pretreated with electron donor and hydrogenation procatalyst (IE21 and IE22) or pretreated with electron donor only with the hydrogenation procatalyst's being added in the polymerization reaction (IE23). Each of the polymers produced in Runs IE21, IE22, and IE23 had a molecular weight greater than the polymer produced by the catalyst system having only the heterogeneous catalyst.

MPCAT-4 is PCAT-1 pretreated with Ti(O$^i$Pr)$_4$ and has a 1.5:1 molar ratio of Ti(O$^i$Pr)$_4$:Ti. In Run 1E24, MPACT-4 was combined with Cp$_2$TiCl$_2$ E2 in a 1:1 molar ratio of Cp$_2$TiCl$_2$/Ti, and the polymer produced had a molecular weight of 2.48 times that of the polymer produced by the PCAT-1 in Run CE19.

TABLE 10

Continuous Polymerization Process Conditions and Results

| Example No. | CE17 | IE29 | IE30 |
|---|---|---|---|
| Procatalyst | PCAT-1 | MPCAT-3 | MPCAT-4 |
| Cocatalyst | TEA | TEA | TEA |
| Feed Temperature (° C.) | 14.8 | 14.9 | 15.3 |
| Total Solvent Flow (kg/hr) | 15.7 | 15.7 | 15.9 |
| Ethylene Flow (kg/hr) | 2.2 | 2.2 | 2.2 |
| 1-Octene Flow (kg/hr) | 0.76 | 0.76 | 0.76 |
| Hydrogen Flow (g/hr) | 0.30 | 0.31 | 0.31 |
| Reactor Temperature (° C.) | 189.9 | 190.0 | 190.0 |
| Reactor Pressure (kPa) | 4991 | 5007 | 5001 |
| Reactor Ethylene Conversion (%) | 92.0 | 92.1 | 92.2 |
| Hydrogenation Procatalyst | None | E1 | E1 |
| TEA/Ti (mol/mol) | 4 | 4 | 8 |
| Cp$_2$TiCl$_2$/Ti in PCAT (mol/mol) | 0 | 0.08 | 0.11 |
| Catalyst Efficiency (g/g Ti) ×10$^6$ | 0.52 | 0.28 | 0.21 |
| Properties of Ethylene-Based Polymer Produced | | | |
| MI (g/10 min) | 4 | 0.5 | 0.5 |
| Density (g/cc) | 0.9309 | 0.9343 | 0.9339 |
| Mw (by GPC) | 81,621 | 126,494 | 139,366 |
| Mw/Mw(0) (by GPC) | 1 | 1.55 | 1.71 |

In the continuous reaction process, ethylene was polymerized in the presence of catalyst systems of Run CE17 (PCAT-1), Run IE29 (MPCAT-3), and Run IE30 (MPCAT-4). The ethylated Cp$_2$TiCl$_2$ hydrogenation procatalyst E1 was introduced to the reactor in a separate feed line. The results demonstrated that the combination of electron donor and hydrogenation procatalyst lead to a substantial increase in the molecular weight of the produced polymer. The increase in polymer density for IE29 and IE30 indicated higher contents of HDF in the polymers compared to the baseline polymer of CE17.

The invention claimed is:

1. A catalyst system comprising:
   a heterogeneous procatalyst comprising a titanium species, an aluminum species, and a magnesium chloride component; and
   an electron donor; and
   a hydrogenation procatalyst having the formula Cp$_2$TiX$_n$TiCp$_2$ or Cp$_2$TiX$_n$ where:
   each Cp is cyclopentadienyl substituted with at least one (C$_1$-C$_{10}$)alkyl;
   each X is independently monoanionic or neutral, wherein each X is independently (C$_1$-C$_{40}$)hydrocarbon, (C$_1$-C$_{40}$)heterohydrocarbon, (C$_1$-C$_{40}$)hydrocarbyl, (C$_1$-C$_{40}$)heterohydrocarbyl, or a halogen atom; and
   n is 1 or 2.

2. The catalyst system of claim 1, wherein the electron donor is a vanadium compound chosen from VOX$_3$ or VO(OR$^3$)$_3$, where each X is independently a halogen atom or (C$_1$-C$_{40}$)heterohydrocarbyl anion; and each R$^3$ is independently (C$_1$-C$_{20}$)hydrocarbyl or —C(O)R$^{11}$, where R$^{11}$ is (C$_1$-C$_{30}$)hydrocarbyl.

3. The catalyst system of claim 1, wherein the heterogeneous procatalyst is an unsupported bulk catalyst.

4. The catalyst system of claim 1, wherein the heterogeneous procatalyst comprises particles having an average particle size from 0.1 micron to 10 microns.

5. The catalyst system of claim 1, wherein the heterogeneous procatalyst comprises heterogeneous procatalyst particles with a non-controlled morphology.

6. The catalyst system of claim 1, wherein the heterogeneous procatalyst comprises heterogeneous procatalyst particles, wherein greater than or equal to 10% of the particles have a particle size less than or equal to 1 micron.

7. The catalyst system of claim 1, further comprising an alkyl aluminum cocatalyst having a structure Al(R$^2$)$_3$, where each R$^2$ is independently (C$_1$-C$_{20}$)alkyl or halogen atom.

8. The catalyst system of claim 1, further comprising an alkyl aluminum cocatalyst selected from the group consisting of trialkylaluminum compounds, dialkylaluminum chlorides, alkylalumnium dichlorides, alkylaluminum alkoxides, and alkylaluminoxanes.

9. A polymerization process comprising reacting (C$_2$-C$_{12}$) α-olefins in solution in the presence of a catalyst system, the catalyst system comprising:
   a heterogeneous procatalyst comprising a titanium species, an aluminum species, and a magnesium chloride component;

an electron donor; and a hydrogenation procatalyst having the formula $Cp_2TiX_nTiCp_2$ or $Cp_2TiX_n$ where:

each Cp is cyclopentadienyl substituted with at least one $(C_1-C_{10})$alkyl;

each X is independently monoanionic or neutral, wherein each X is independently $(C_1-C_{40})$hydrocarbon, $(C_1-C_{40})$heterohydrocarbon, $(C_1-C_{40})$hydrocarbyl, $(C_1-C_{40})$heterohydrocarbyl, or a halogen atom; and n is 1 or 2.

10. The polymerization process of claim 9, wherein the catalyst system further comprises an alkylaluminum cocatalyst having a structure $Al(R^2)_3$, where each $R^2$ is independently $(C_1-C_{20})$alkyl or halogen atom.

11. The polymerization process of claim 9, wherein the catalyst system further comprises an alkylaluminum cocatalyst selected from the group consisting of trialkylaluminum, dialkylaluminum chloride, alkylaluminum dichloride, alkylaluminum alkoxide, or alkylaluminoxane.

12. The polymerization process of claim 9, wherein the electron donor is a vanadium compound chosen from $VOX_3$ or $VO(OR^3)_3$, where each X is independently a halogen atom or $(C_1-C_{40})$heterohydrocarbyl anion; and $R^3$ is $(C_1-C_{20})$hydocarbyl or $-C(O)R^{11}$, where $R^{11}$ is $(C_1-C_{30})$hydrocarbyl.

13. The polymerization process of claim 9, wherein the heterogeneous procatalyst is an unsupported bulk catalyst.

14. The polymerization process of claim 9, wherein the heterogeneous procatalyst comprises heterogeneous procatalyst particles, wherein greater than or equal to 10% of the particles have a particle size less than or equal to 1 micron.

15. The polymerization process of claim 9, wherein the heterogeneous catalyst comprises heterogeneous procatalyst particles with a non-controlled particle morphology.

16. The polymerization process of claim 9, wherein the $(C_2-C_{12})\alpha$-olefins in solution are reacted in a reactor at a reaction temperature from 150° C. to 350° C.

17. The polymerization process of claim 9, wherein the heterogeneous procatalyst comprises particles having an average particle size from 0.1 micron to 10 microns.

18. The polymerization process of claim 9, wherein the heterogeneous procatalyst comprises particles having an average particle size from 0.1 micron to 10 microns, and wherein the $(C_2-C_{12})\alpha$-olefins in solution are reacted in a reactor at a reaction temperature from 150° C. to 350° C.

* * * * *